W. C. WETHERHOLT.
PNEUMATIC TIRE VALVE.
APPLICATION FILED MAR. 7, 1910.
1,006,159.
Patented Oct. 17, 1911.
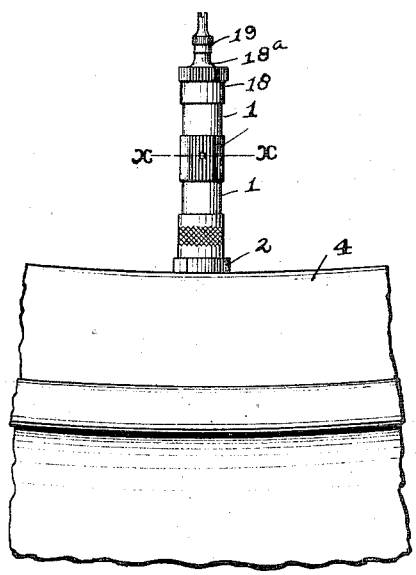
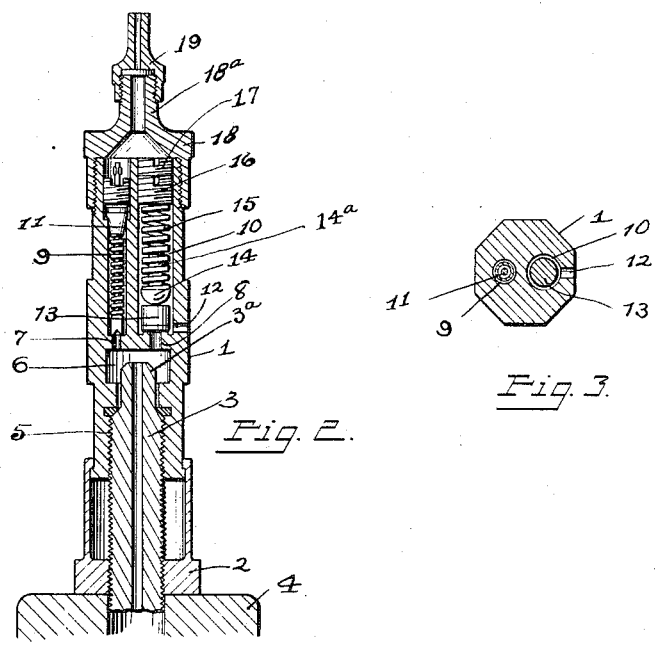
Witnesses
William C. Wetherholt.
By C. C. Shepherd

UNITED STATES PATENT OFFICE.

WILLIAM C. WETHERHOLT, OF COLUMBUS, OHIO.

PNEUMATIC-TIRE VALVE.

1,006,159. Specification of Letters Patent. Patented Oct. 17, 1911.

Application filed March 7, 1910. Serial No. 547,819.

*To all whom it may concern:*

Be it known that I, WILLIAM C. WETHERHOLT, a citizen of the United States, residing at Columbus, in the county of Franklin and State of Ohio, have invented certain new and useful Improvements in Pneumatic-Tire Valves, of which the following is a specification.

My invention relates to the improvement of pneumatic tire valves and the objects of my invention are to provide an improved construction of valve of this class wherein is combined with the usual form of inlet valve an automatic valve by means of which air will be automatically discharged from the inflated tube when the air within said tube has attained a predetermined pressure, thereby overcoming the danger of over-charging the tube with air pressure by which means the tendency of the tubes to blow out, is obviated and a uniform pressure is attained within the tires. These objects I accomplish in the manner illustrated in the accompanying drawing, in which—

Figure 1 is a view in elevation of a portion of a wheel rim and tire showing my improved valve body in connection therewith, Fig. 2 is an enlarged central longitudinal section of the tire body, showing the valves therein in elevation, and, Fig. 3 is an enlarged transverse section on line $x$—$x$ of Fig. 1.

Similar numerals refer to similar parts throughout the several views.

In carrying out my invention, I employ an external valve casing or body which is of the general cylindrical form shown at 1, the inner end of said casing being in the nature of a nut 2 which is designed to be screwed on to the usual externally threaded tubular valve stem 3 one end of which passes through the wheel rim 4 and is connected in the usual manner with the inner tube of an inflatable tire.

As indicated at 5 the valve casing body 1 is also screwed in connection with the outer portion of the body of the stem 3, said stem having its usual reduced extension $3^a$ projecting into an internal chamber 6 of the valve casing, which is preferably located near the center of the length of said casing. Through the medium of reduced passages 7 and 8, the chamber 6 communicates with the inner ends of two separated valve chambers 9 and 10 which lead outward from the outer ends of the passages 8 to the outer open end of the valve casing. Within the valve chamber 9 is inserted a common form of spring actuated inlet valve 11, that herein shown being known as the Schraeder valve. The inner end portion of the valve chamber 10 is provided with a laterally extending port or air outlet 12 and into said chamber is inserted a valve body 13, the inner end of which is adapted to close the outer end of the passage 8 and thus cut off communication between said passage and the outlet 12. This valve body 13 is normally held in closed position by the pressure of the inner enlarged end or head 14 of a stem $14^a$ which extends toward the outer end of the chamber 10 and which is surrounded by the inner end portion of a coiled spring 15. This spring is retained under desirable tension by screwing into the outer end portion of the valve chamber 10 a threaded plug 16 which in turn is pressed upon by an outer or locking plug 17 which is also screwed into the outer end of the chamber 10.

Upon the outer threaded end portion of the casing 1, is screwed a suitable form of cap 18 the latter having a hollow stem extension $18^a$ upon which is adapted to be screwed the usual valve casing terminal cap 19.

It will be understood that the filling of a pneumatic tube with air under pressure, is accomplished by removing the terminal cap 19 and temporarily affixing to the threaded stem $18^a$ a tube from a suitable source of compressed air supply, such as a pump or tank. The air which is forced in through the central passage of the cap stem or tube $18^a$ operates in the usual manner to open the valve 11 and permit the air to pass from the valve chamber 9 through the passage 7 into the chamber 6 and thence through the central passage of the stem 3 into the tube. It will be understood, however, that prior to this operation of filling the tube, the valve spring 15 has been compressed or tensioned so as to resist a pressure of air against the inner end of the valve 13 up to a certain predetermined limit and that when this limit of pressure has been reached within the tube which is being charged, the valve 13 will be forced open sufficiently to admit of the escape of air from the pneumatic tube and the chamber 6 out through the outlet passage or port 12. It is obvious that when sufficient air has thus escaped to reduce the pressure within the pneumatic tube to the desired standard, the spring 15 will again act to move the valve 13 to the closed position.

Heretofore considerable difficulty has been experienced in the pumping of compressed air into pneumatic tubes such as those employed for automobile and bicycle tires, inasmuch as it often happens that such tubes are subjected to an undesirable and dangerous degree of inflation without the knowledge of the person operating the pump or other air supply device. The use of my device, as will readily be understood, provides an automatic means for overcoming this difficulty, thus not only insuring against over inflation of the tire or pneumatic tube, but providing means for preventing the occurrence of blow outs due to over inflation or to the forcing of such a quantity of air into the tube as to result in the tube being blown out through the heating of the tire or tube and the consequent explosion of air therein.

As will readily be understood my improved valve construction may be produced at a reasonable cost of manufacture and inasmuch as both the inlet and automatic or safety valve are inclosed in one casing, my device will present a neat appearance in connection with the wheel rim.

Although I have shown what is known as the Schraeder inlet valve in connection with my device, it is obvious that other well known forms of tire inlet valves might be employed and it will also be understood that while my invention is particularly applicable to tires or the inner tubes thereof, it may be employed in conjunction with other air inflated objects or devices.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

What I claim, is—

In a valve of the class described, the combination with an externally threaded tubular member, of an outer casing the lower portion of which screws upon said tubular member, the upper portion of said casing being divided into two parallel chambers, one of said chambers having a spring actuated inlet valve, the second of said chambers having a spring actuated outlet valve, said valves controlling the passage of air to and from a common chamber beneath said valves, and a threaded member disposed in the outlet valve chamber above said spring for varying the tension of said spring and thus varying the pressure at which said outlet valve opens.

In testimony whereof I affix my signature in presence of two witnesses.

WILLIAM C. WETHERHOLT.

Witnesses:
  A. L. PHELPS,
  E. B. MAURER.